United States Patent
Sharma

(10) Patent No.: US 10,788,830 B2
(45) Date of Patent: Sep. 29, 2020

(54) SYSTEMS AND METHODS FOR DETERMINING A VEHICLE POSITION

(71) Applicant: QUALCOMM Incorporated, San Diego, CA (US)

(72) Inventor: Arunandan Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/663,053

(22) Filed: Jul. 28, 2017

(65) Prior Publication Data

US 2019/0033867 A1 Jan. 31, 2019

(51) Int. Cl.
| | | |
|---|---|---|
| *G06D 1/00* | (2006.01) | |
| *G05D 1/00* | (2006.01) | |
| *G01C 11/06* | (2006.01) | |
| *G01C 21/28* | (2006.01) | |
| *G05D 1/02* | (2020.01) | |
| *G01C 21/26* | (2006.01) | |

(Continued)

(52) U.S. Cl.
CPC ........... *G05D 1/0094* (2013.01); *G01C 11/06* (2013.01); *G01C 21/26* (2013.01); *G01C 21/28* (2013.01); *G05D 1/027* (2013.01); *G05D 1/0246* (2013.01); *G05D 1/0278* (2013.01); *G06K 9/00798* (2013.01); *G06T 7/73* (2017.01); *G08G 1/0133* (2013.01); *G08G 1/0137* (2013.01); *G05D 2201/0213* (2013.01)

(58) Field of Classification Search
CPC ........ G01C 11/06; G01C 21/26; G01C 21/28; G01C 3/06; G05D 1/0094; G05D 1/0246; G05D 1/027; G05D 1/0278; G05D 2201/0213; G06K 9/00798; G06K 9/4604; G06T 7/73; G06T 7/13; G06T 7/20; G06T 7/50; G06T 7/536; G06T 2207/30261; G08G 1/0133; G08G 1/0137; G08G 1/166; G08G 1/167
See application file for complete search history.

(56) References Cited

U.S. PATENT DOCUMENTS 5,233,417 A * 8/1993 Nouso ................ H04N 5/23254
                                                                                 348/207.99
6,704,621 B1    3/2004 Stein et al.
(Continued)

FOREIGN PATENT DOCUMENTS

EP          1492999 A1    1/2005
JP       2015194397 A    11/2015
(Continued)

OTHER PUBLICATIONS

International Search Report and Written Opinion—PCT/US2018/039968—ISA/EPO—dated Nov. 6, 2018.

*Primary Examiner* — Mekonen T Bekele
(74) *Attorney, Agent, or Firm* — Qualcomm Incorporated

(57) ABSTRACT

A method is described. The method includes obtaining a plurality of images. The method also includes detecting an object in the plurality of images. The method further includes determining a plurality of feature points on the object. The feature points have an established relationship to each other based on an object type. The method additionally includes determining a motion trajectory and a camera pose relative to a ground plane using the plurality of feature points.

31 Claims, 9 Drawing Sheets

(51) Int. Cl.
   *G06T 7/73*   (2017.01)
   *G06K 9/00*   (2006.01)
   *G08G 1/01*   (2006.01)

(56) References Cited

U.S. PATENT DOCUMENTS

| | | | |
|---|---|---|---|
| 9,052,207 B2 | 6/2015 | Miksa et al. | |
| 9,063,548 B1* | 6/2015 | Ferguson | B60W 30/12 |
| 9,201,424 B1* | 12/2015 | Ogale | G05D 1/0253 |
| 9,357,136 B2* | 5/2016 | Noorkami | H04N 5/2352 |
| 9,395,192 B1* | 7/2016 | Silver | G06K 9/00798 |
| 2004/0167667 A1* | 8/2004 | Goncalves | G01C 21/12 |
| | | | 700/245 |
| 2009/0080697 A1* | 3/2009 | Kishikawa | G01C 15/00 |
| | | | 382/103 |
| 2009/0207257 A1* | 8/2009 | Jung | G06T 7/73 |
| | | | 348/208.1 |
| 2010/0235032 A1* | 9/2010 | Sung | G05D 1/0246 |
| | | | 701/25 |
| 2010/0299000 A1* | 11/2010 | Nakamura | B60R 1/00 |
| | | | 701/1 |
| 2012/0121161 A1* | 5/2012 | Eade | G05D 1/0253 |
| | | | 382/153 |
| 2012/0262455 A1* | 10/2012 | Watanabe | G06T 7/75 |
| | | | 345/420 |
| 2013/0242120 A1* | 9/2013 | Venkatraman | H04N 5/225 |
| | | | 348/208.4 |
| 2013/0308002 A1* | 11/2013 | Jiang | H04N 5/23222 |
| | | | 348/208.6 |
| 2015/0222799 A1* | 8/2015 | Noorkami | H04N 5/2352 |
| | | | 348/223.1 |
| 2016/0068114 A1* | 3/2016 | Liao | G06T 7/73 |
| | | | 348/148 |
| 2018/0165815 A1* | 6/2018 | Okada | G06T 7/13 |

FOREIGN PATENT DOCUMENTS

| | | |
|---|---|---|
| KR | 20110046727 A | 5/2011 |
| KR | 20150049529 A | 5/2015 |
| WO | 2012040644 A1 | 3/2012 |

* cited by examiner

SYSTEMS AND METHODS FOR DETERMINING A VEHICLE POSITION

TECHNICAL FIELD

The present disclosure relates generally to electronic devices. More specifically, the present disclosure relates to systems and methods for determining a vehicle position.

BACKGROUND

Electronic devices (e.g., cellular telephones, wireless modems, computers, digital music players, Global Positioning System (GPS) units, Personal Digital Assistants (PDAs), gaming devices, etc.) have become a part of everyday life. Small computing devices are now placed in everything from vehicles to housing locks. The complexity of electronic devices has increased dramatically in the last few years. For example, many electronic devices have one or more processors that help control the device, as well as a number of digital circuits to support the processor and other parts of the device.

Some electronic devices (e.g., vehicles) may be equipped with advanced driver assistance systems. These systems may be used in autonomous vehicles. One useful technology in these systems is visual inertial odometry (VIO). However, everyday vehicular driving may include semi-controlled environments with varied scenarios that are challenging for computer-based vehicular automation in general and VIO in particular. Perception-based vehicle positioning and localization may be beneficial in assisting with visual inertial odometry.

SUMMARY

A method is described. The method includes obtaining a plurality of images. The method also includes detecting an object in the plurality of images. The method further includes determining a plurality of feature points on the object. The feature points have an established relationship to each other based on an object type. The method additionally includes determining a motion trajectory and a camera pose relative to a ground plane using the plurality of feature points. The object may include a lane marker or a traffic sign.

Determining the plurality of feature points may include determining three or more end corners of a detected lane marker. Determining the plurality of feature points may include determining three or more vertices of a detected traffic sign.

Determining the motion trajectory may include determining scale information using the plurality of feature points. Determining the motion trajectory and the camera pose may include comparing a plurality of feature points determined from a first image to corresponding feature points determined from a second image.

The method may also include combining measurements of the detected object with inertial sensor measurements. The motion trajectory may be determined based on the combined measurements.

The method may also include combining satellite navigation receiver measurements with measurements of the detected object. A pose and position in a global frame may be determined based on the combined measurements. Vehicle sensor measurements from one or more vehicle sensors may be combined with the satellite navigation receiver measurements and measurements of the detected object. The pose and position in the global frame may be determined based on the combined measurements.

The method may also include combining measurements of the detected object with speedometer measurements. The motion trajectory may be determined based on the combined measurements.

The method may be performed in a vehicle. The method may also include transmitting the camera pose to a mapping service. In another implementation, the method may be performed by a server.

An electronic device is also described. The electronic device includes a memory and a processor in communication with the memory. The processor is configured to obtain a plurality of images. The processor is also configured to detect an object in the plurality of images. The processor is further configured to determine a plurality of feature points on the object. The feature points have an established relationship to each other based on an object type. The processor is additionally configured to determine a motion trajectory and a camera pose relative to a ground plane using the plurality of feature points.

A non-transitory computer readable medium storing computer executable code is also described. The computer readable medium includes code for causing an electronic device to obtain a plurality of images. The computer readable medium also includes code for causing the electronic device to detect an object in the plurality of images. The computer readable medium further includes code for causing the electronic device to determine a plurality of feature points on the object. The feature points have an established relationship to each other based on an object type. The computer readable medium additionally includes code for causing the electronic device to determine a motion trajectory and a camera pose relative to a ground plane using the plurality of feature points.

An apparatus is also described. The apparatus includes means for obtaining a plurality of images. The apparatus also includes means for detecting an object in the plurality of images. The apparatus further includes means for determining a plurality of feature points on the object. The feature points have an established relationship to each other based on an object type. The apparatus additionally includes means for determining a motion trajectory and a camera pose relative to a ground plane using the plurality of feature points.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
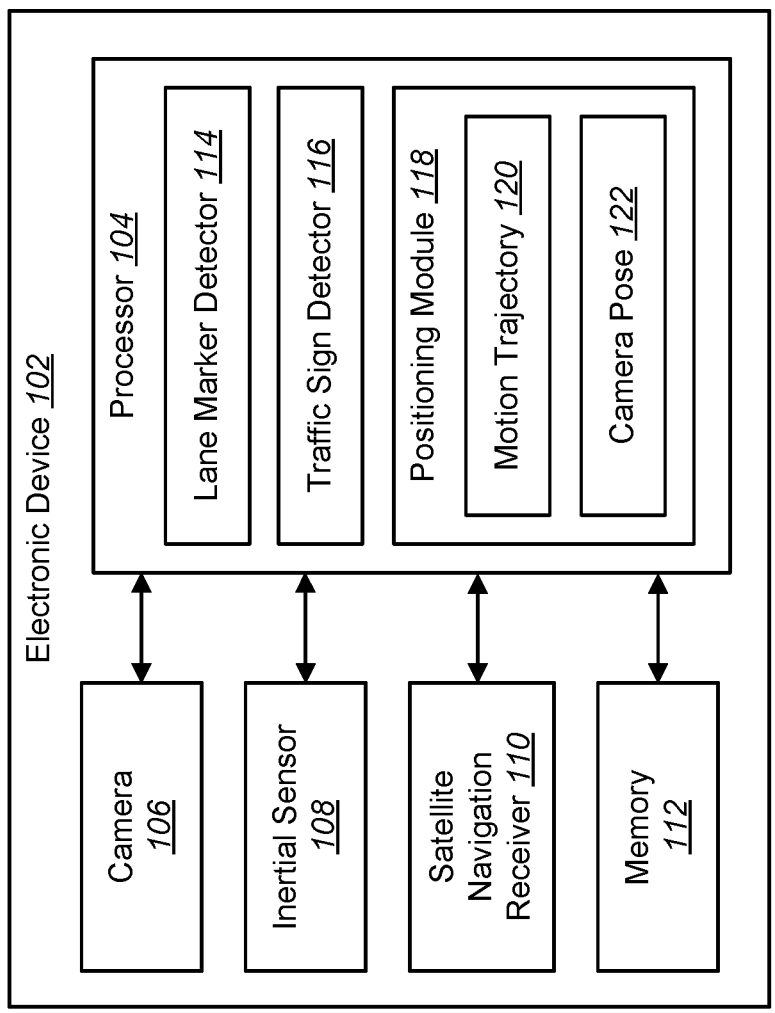
FIG. 1 is a block diagram illustrating one example of an electronic device in which systems and methods for determining a vehicle position may be implemented.

FIG. 1 is a block diagram illustrating one example of an electronic device 102 in which systems and methods for determining a vehicle position may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, Personal Digital Assistants (PDAs), set-top boxes, appliances, etc. For instance, the electronic device 102 may be a vehicle used in an Advanced Driver Assistance System (ADAS).

The electronic device 102 may be configured with a positioning module 118. In a configuration, the positioning module 118 may include or may implement a visual inertial odometry (VIO) system. The VIO system may be implemented as a positioning engine that combines camera input with inertial information provided by an inertial sensor 108 (e.g., inertial measurement unit (IMU) system) to determine the position of the electronic device 102. The inertial sensor 108 may include one or more accelerometers and/or one or more gyroscopes with which the inertial sensor 108 generates inertial measurements.

In an aspect, visual inertial odometry may be used for localizing a vehicle. VIO may be part of an autonomous driving system. One purpose of the VIO system is to use information from nearby features (e.g., corners of a building or the corner of a tree) to locate a vehicle. The VIO system may provide knowledge about where the electronic device 102 is located with respect to its environment. It should be noted that VIO may provide a localized position. For example, VIO may provide a position of the electronic device 102 relative to a previous position.

Current implementations of visual inertial odometry for vehicle localization for automotive applications rely on inertial sensors 108 and a monocular camera 106. Using images captured by the camera 106, the VIO system may detect and track key points (e.g., sharp corners) in the images. However, if a camera 106 is the only sensor employed, then it is not possible to know the scale or depth of the features because the camera projects a three-dimensional (3D) world onto a two-dimensional (2D) image. By combining inertial sensor measurements with moving camera frames, it is possible to estimate the scale of the key point features. This scale can then be used to estimate the new pose of the camera 106 relative to its previous pose, thereby estimating the ego-motion of the vehicle. In an approach, the VIO system may integrate inertial measurements to obtain the position of the electronic device 102.

Everyday vehicular driving may occur in a semi-controlled environment with varied scenarios that are challenging for computer-based vehicular automation in general and VIO in particular. Inertial measurements may not be sufficient to determine the location of the electronic device 102. One problem with inertial measurements in a VIO application is scale drift. As a vehicle moves with a constant velocity, biases in the inertial sensor 108 may not be observable, which may result in scale drift. As used herein, "bias" (also referred to as sensor bias) is the difference between an ideal output and the actual output provided by a sensor 108 (e.g., gyroscope or accelerometer).

In a monocular VIO system (e.g., using a monocular camera 106 to provide image information), the depth of the vision features may be computed using an estimated VIO trajectory. The vision features may not provide any correction for the scale drift.

In an example, when a vehicle (e.g., the electronic device 102) moves at a constant velocity, especially in a highway scenario, the accelerometer that measures the acceleration becomes zero. In this case, there is no observable signal for biases in the system (i.e., the accelerometer bias), which becomes a scalar value. Therefore, in a monocular camera system, for all the features that are observed, the VIO system can only measure the location of the features up to a scale. For example, if a monocular camera were to look at the same feature point from three different camera vantage points, the position of the feature could be triangulated in the real world, but the position would only be up to a scale. The position of the feature point can arbitrarily move away in a depth sense. Therefore, the precise location of the feature point cannot be observed without additional data.

It should be noted that an advantage of using an inertial sensor 108 is that when there is enough acceleration or excitation in the accelerometer or in the gyroscope, the scale becomes observable. The problem with vehicular motion is that when the vehicle is going in a very straight line with approximately constant velocity, the scale becomes unobservable using only inertial measurements.

Another problem with inertial measurements in a VIO application is that IMU measurements tend to become noisy at constant velocity. Without the use of visual features to constrain the IMU measurements, the six degrees of freedom of the camera pose 122 is unobservable. In the case of automotive VIO, the camera pose 122 may be the pose of the vehicle itself.

In some approaches, vehicle localization may be performed using a map. For example, a vehicle may use GPS coordinates and a preconfigured digital map of features in an environment to determine the position of the vehicle. Features within the environment may be detected and compared to the map. For example, buildings, bridges or other structures may be detected in an image and associated with the digital map to determine the orientation of the vehicle. However, a problem with this map-based approach is that features change over time and a map may not accurately reflect the environment. Therefore, this approach relies on updated maps, which may not always be available. Furthermore, even highly detailed maps may not identify all features in an environment that may be used for vehicle positioning.

For the VIO system to work correctly, the key point features should be stationary. However, in environments where stationary features are not easy to observe, the lack of features can result in a significant drift in scale and can cripple the VIO algorithm. For example, when driving through a desert landscape, few features may be observable by the camera 106.

When applied to automotive applications, the VIO system can be made more robust if it employs one or more mechanisms that are commonly available while driving. In one approach, one of the complementary mechanisms that can help in scale determination is vehicle velocity. The vehicle velocity can come from a speedometer (e.g., a wheel-speed encoder) or from GPS.

In another approach, the electronic device 102 may use information from perception algorithms to aid in determining a vehicle position. In an automotive context, the electronic device 102 may be a vehicle or may be included in a vehicle. These perception algorithms may include a lane marker detector 114 and/or a traffic sign detector 116.

The electronic device 102 may include one or more components or elements. One or more of the components or elements may be implemented in hardware (e.g., circuitry) or a combination of hardware and software and/or firmware (e.g., a processor 104 with instructions).

In some configurations, the electronic device 102 may include a processor 104, a memory 112, one or more cameras 106, one or more inertial sensors 108 and/or one or more satellite navigation receivers 110 (e.g., a GPS receiver, a global navigation satellite system (GNSS), etc.). The processor 104 may be coupled to (e.g., in electronic communication with) the memory 112, camera(s) 106, inertial sensor(s) 108 and/or satellite navigation receiver(s) 110.

The processor 104 may be a general-purpose single- or multi-chip microprocessor (e.g., an ARM), a special-purpose microprocessor (e.g., a digital signal processor (DSP)), a microcontroller, a programmable gate array, etc. The processor 104 may be referred to as a central processing unit (CPU). Although just a single processor 104 is shown in the electronic device 102, in an alternative configuration, a combination of processors 104 (e.g., an image signal processor (ISP) and an application processor, an ARM and a DSP, etc.) could be used. The processor 104 may be configured to implement one or more of the methods disclosed herein. For example, the processor 104 may be configured to determine a motion trajectory 120 and a camera pose 122 of the electronic device 102.

In some configurations, the electronic device 102 may perform one or more of the functions, procedures, methods, steps, etc., described in connection with one or more of FIGS. 2-9. Additionally or alternatively, the electronic device 102 may include one or more of the structures described in connection with one or more of FIGS. 2-9.

The electronic device 102 may obtain one or more images (e.g., digital images, image frames, video, etc.) and other sensor data. For example, the one or more cameras 106 may capture a plurality of images. In an implementation, the camera 106 may be a forward-facing monocular camera that is mounted on a vehicle. Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.).

The electronic device 102 may detect a lane marker or a traffic sign. The electronic device 102 may be configured with a lane marker detector 114, a traffic sign detector 116 or both. An autonomous vehicle may be equipped with robust perception algorithms: the lane marker detector 114 and traffic sign detector 116. In an approach, the lane marker detector 114 and traffic sign detector 116 may be implemented as computer vision (CV)-based algorithms. In another approach, the lane marker detector 114 and traffic sign detector 116 may be implemented as a deep neural network algorithm. It should be noted that the lane marker detector 114 and traffic sign detector 116 may be implemented using other algorithms than those listed herein.

The lane marker detector 114 and traffic sign detector 116 may be configured to identify a specific set of features that are observed on the road and driving environments. The lane marker detector 114 and traffic sign detector 116 are more robust than a normal key-point tracker. For example, in a typical VIO system, a key-point tracker may identify any stationary object that has sharp contrast (i.e., sharp corners). However, these key-points may not be optimal for use in vehicle positioning. For example, a key-point tracker may detect a leaf on a tree or a building in the far distance.

The lane marker detector 114 and traffic sign detector 116, on the other hand, are configured to detect road features that may be reliably used to perform vehicle positioning. The lane marker detector 114 is configured to detect one or more lane markers or lane marker segments within an image. A lane marker is a device or material on a road surface that conveys information. Examples of lane markers include painted traffic lanes, painted cross-walks, painted parking spaces, handicap parking spaces, reflective markers, Botts' dots and rumble strips.

Lane markers have a known configuration and relationship to the electronic device 102. For example, the size of a lane marker may be known or determined by the lane marker detector 114. Furthermore, the fact that lane markers are located on the road may be leveraged to determine the position of the vehicle.

The traffic sign detector 116 may determine one or more traffic signs in an image. Using CV or deep neural network algorithms, the traffic sign detector 116 may identify that an object in an image is a traffic sign. The traffic sign detector 116 may also determine the type of traffic sign that is observed in a scene. For example, the traffic sign detector 116 may determine that a traffic sign is a speed limit sign, a freeway exit sign, a road-hazard warning sign, etc.

It should be noted that the lane marker detector 114 and traffic sign detector 116 are designed to identify a specific set of features that are observed on the road, and in the driving environment. The features (e.g., lane markers and traffic signs) have known configurations. For example, lane markers and traffic signs have certain shapes (e.g., rectangular, circular, octagonal, etc.) and sizes.

The lane marker detector 114 may be configured to detect the lane markers on the road and other metrics. These metrics may include the lateral distance of the vehicle from the lane marker. The lane marker detector 114 may also detect the heading of the vehicle with respect to the lane markers. The lane marker detector 114 may determine quality metrics for confidence in the result of the lane marker detection/tracking. The lane marker detector 114 may also detect corners of the lane markers in the image plane and possible raised pavement marker (e.g., Botts' dots) locations.

The traffic sign detector 116 may be configured to detect the traffic signs on the road and other metrics. These metrics may include detecting the vertices of traffic signs (e.g., corner points) in the image plane. The traffic sign detector 116 may also determine quality metrics for confidence in the result of the traffic sign detection/tracking.

The processor 104 may determine a plurality of feature points on the lane marker or the traffic sign. As used herein, the term feature points refers to various locations on the same feature (e.g., lane marker or traffic sign). The processor 104 may determine a pixel location in the digital image for a given feature point.

The feature points have an established relationship to each other based on object type. Because the feature points are from the same feature (e.g., lane marker or traffic sign), the feature points have a known association. In other words, once the processor 104 detects a certain feature, the relationship of multiple points on that feature may be known. One object type may be a lane marker. Another object type may be a traffic sign.

In the case of a lane marker, the lane marker detector 114 may determine three or more end corners of a detected lane marker. For example, for a rectangular lane marker, the lane marker detector 114 may determine at least three or all four corner points of the lane marker. Because this feature is known to be a lane marker, these three or more corner points have the established relationship of belonging to the same lane marker. Furthermore, these corner points have the established relationship of defining the extents of the lane marker. In other words, these corner points define the boundary of the lane marker. Additionally, the width and/or length of a lane marker may be determined based on the corner points.

In the case of a traffic sign, the traffic sign detector 116 may determine three or more vertices of a detected traffic sign. For example, for a rectangular sign, the traffic sign detector 116 may determine at least three or all four vertices of the sign. For a circular sign, the traffic sign detector 116 may determine three points on the sign. Because this feature is determined to be a traffic sign, these three or more vertices have the established relationship of belonging to the same traffic sign. The vertices may define the boundary of the traffic sign.

Because the lane marker detector 114 and traffic sign detector 116 are more robust in detecting and tracking scene features due to their inherent design, they can be used to provide reliable scale information compared to a corner detector-based key-point tracker, which relies more on heuristics and is less precise. For example, a typical VIO key-point tracker may identify any features on the road that have strong contrast. However, the relationships of the detected points are not known to the key-point tracker.

For example, the key-point tracker does not know whether two or more detected points belong to the same feature or not.

The processor 104 may determine a motion trajectory 120 and a camera pose 122 relative to a ground plane using the plurality of feature points detected by either the lane marker detector 114 or the traffic sign detector 116. For example, the positioning module 118 may determine scale information using the plurality of feature points. The positioning module 118 may receive feature points of a lane marker from the lane marker detector 114. The positioning module 118 may receive feature points of a traffic sign from the traffic sign detector 116.

The processor 104 may determine scale information using the plurality of feature points.

The positioning module 118 may determine the motion trajectory 120 by comparing the plurality of feature points from a first image to the corresponding feature points in a second image. As used herein, the term "motion trajectory" refers to the curve or path of the electronic device 102 as it moves through space. The motion trajectory 120 may be determined in a local frame. In other words, the positioning module 118 may determine the change in position relative to an earlier position. This motion may be referred to as the ego-motion of the vehicle.

It should be noted that the motion trajectory 120 is a localization of the vehicle motion. At this point, the motion trajectory 120 is not related to a global frame. Therefore, the motion trajectory 120 is not dependent on GPS or other global positioning methods. This is beneficial in the case where a GPS signal is unavailable or corrupted. For example, in a parking garage, a GPS signal may be unavailable. Also, in urban canyons, the GPS signal may be corrupted due to interference. However, the systems and methods described herein do not rely on GPS signals or an external map to perform positioning and localization of the vehicle.

In an implementation, the positioning module 118 may receive feature points for a feature in a first image. The positioning module 118 may receive feature points for the same feature in a second image. With knowledge of the elapsed time between the first image and the second image, the positioning module 118 may compare the change in corresponding feature points to determine the motion trajectory 120.

Furthermore, because the feature points (e.g., vertices on traffic signs or the corners of lane markers) tracked by the lane marker detector 114 and traffic sign detector 116 are related to a single geometric shape, the feature points can be used to estimate the camera pose 122. Determining the camera pose 122 is not possible with a conventional corner detector.

In an implementation, the camera pose 122 may be a six degree of freedom (6DoF) pose of the camera 106. The 6DoF pose of the camera 106 may be defined as the translation (e.g., change in position forward/backward, up/down and left/right) and also the angle of orientation (e.g., pitch, yaw and roll) of the camera 106. The camera pose 122 may be used to define the pose of the vehicle itself.

The camera pose 122 may be determined with respect to the local ground. For example, the positioning module 118 may apply a transformation to convert the feature points from the image plane to a ground plane coordinate system. The positioning module 118 may then determine the 6DoF pose based on tracking the changes in the feature points from one image to another image.

It should be noted that the motion trajectory 120 and the camera pose 122 may be determined without using a map. This is beneficial in that the electronic device 102 may perform vehicle positioning without depending upon a map, which could be inaccurate, incomplete or unavailable. Instead, the electronic device 102 may use feature points from detected lane markers or traffic signs to perform vehicle positioning.

In an implementation, the electronic device 102 may combine measurements of the detected lane marker or traffic sign with inertial sensor measurements. For example, the positioning module 118 may couple measurements of the lane marker features and traffic signs with measurements from the inertial sensor(s) 108, to jointly determine the motion trajectory 120. In this case, the positioning module 118 may use inertial measurements when vehicle acceleration is observable. The positioning module 118 may use the measurements of the lane marker features and traffic signs when the inertial measurements are unobservable.

In another aspect, the electronic device 102 may use the determined relative position and orientation of the camera 106 to validate and correct GPS information. Once the relative motion trajectory 120 and camera pose 122 are obtained, these measurements may be fused with GPS information to find the absolute position of the electronic device 102. For example, the motion trajectory 120 and camera pose 122 may be located in the latitude and longitude provided by GPS. This may provide a very accurate position of the vehicle in a global frame of reference.

In an implementation, the electronic device 102 may combine satellite navigation receiver measurements with measurements of the detected lane marker or traffic sign. This may be accomplished as described in connection with FIG. 3.

The memory 112 may store instructions and/or data. The processor 104 may access (e.g., read from and/or write to) the memory 112. The memory 112 may store the images and instruction codes for performing operations by the processor 104. The memory 112 may be any electronic component capable of storing electronic information. The memory 112 may be embodied as random access memory (RAM), read-only memory (ROM), magnetic disk storage media, optical storage media, flash memory devices in RAM, on-board memory included with the processor 104, erasable programmable read-only memory (EPROM), electrically erasable programmable read-only memory (EEPROM), registers, and so forth, including combinations thereof.

Data and instructions may be stored in the memory 112. The instructions may be executable by the processor 104 to implement one or more of the methods described herein. Executing the instructions may involve the use of the data that is stored in the memory 112. When the processor 104 executes the instructions, various portions of the instructions may be loaded onto the processor 104, and various pieces of data may be loaded onto the processor 104.

It should be noted that one or more of the elements or components of the electronic device may be combined and/or divided. It should be noted that one or more of the elements or components described in connection with FIG. 1 may optional.

Figure 2:
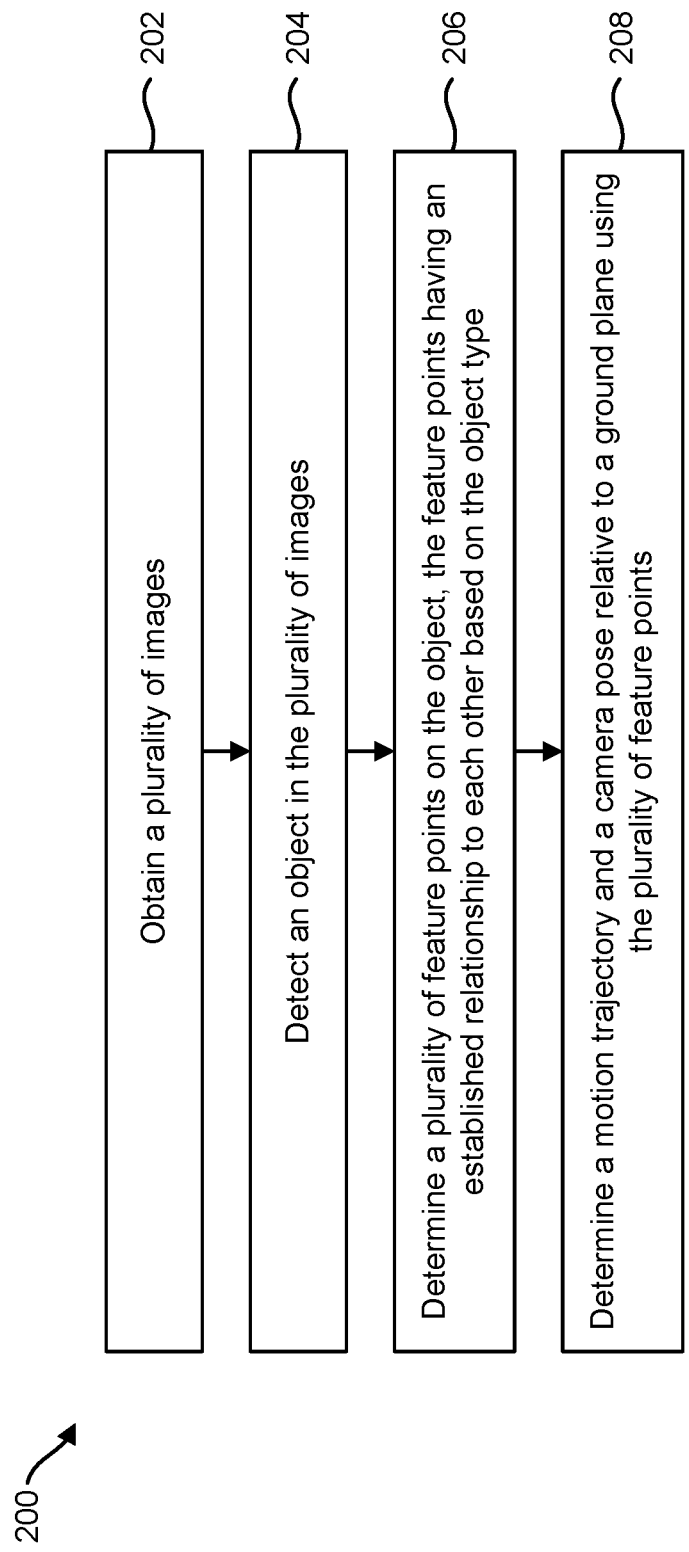
FIG. 2 is a flow diagram illustrating one configuration of a method for determining a vehicle position.

FIG. 2 is a flow diagram illustrating one configuration of a method 200 for determining a vehicle position. The method 200 may be performed by an electronic device 102 as described herein.

The electronic device 102 may obtain 202 a plurality of images. For example, the electronic device 102 may be configured with a camera 106. The camera 106 may capture one or more images (e.g., digital images, image frames, video, etc.).

The electronic device 102 may detect 204 an object in the plurality of images. The object may include a lane marker or a traffic sign. For example, the electronic device 102 may be configured with a lane marker detector 114, a traffic sign detector 116 or both. The lane marker detector 114 may use computer vision (CV)-based or deep neural network algorithms to detect a lane marker or a lane marker segment in an image. The traffic sign detector 116 may also use CV-based or deep neural network algorithms to detect one or more traffic signs in an image.

The electronic device 102 may determine 206 a plurality of feature points on the object. The feature points may have an established relationship to each other based on the object type. The relationship between the feature points is known based on the object type. In the case of a lane marker, the lane marker detector 114 may determine three or more end corners of a detected lane marker. The three or more corner points have the established relationship of belonging to the same lane marker and may define the extents of the lane marker.

In the case of a traffic sign, the traffic sign detector 116 may determine three or more vertices of a detected traffic sign. The three or more vertices have the established relationship of belonging to the same traffic sign and may define the boundary of the traffic sign.

The electronic device 102 may determine 208 a motion trajectory 120 and a camera pose 122 relative to a ground plane using the plurality of feature points. For example, the electronic device 102 may determine scale information using the plurality of feature points. In an implementation, the electronic device 102 may determine 208 the motion trajectory 120 and the camera pose 122 by comparing the plurality of feature points determined from a first image to corresponding feature points determined from a second image.

Figure 3:
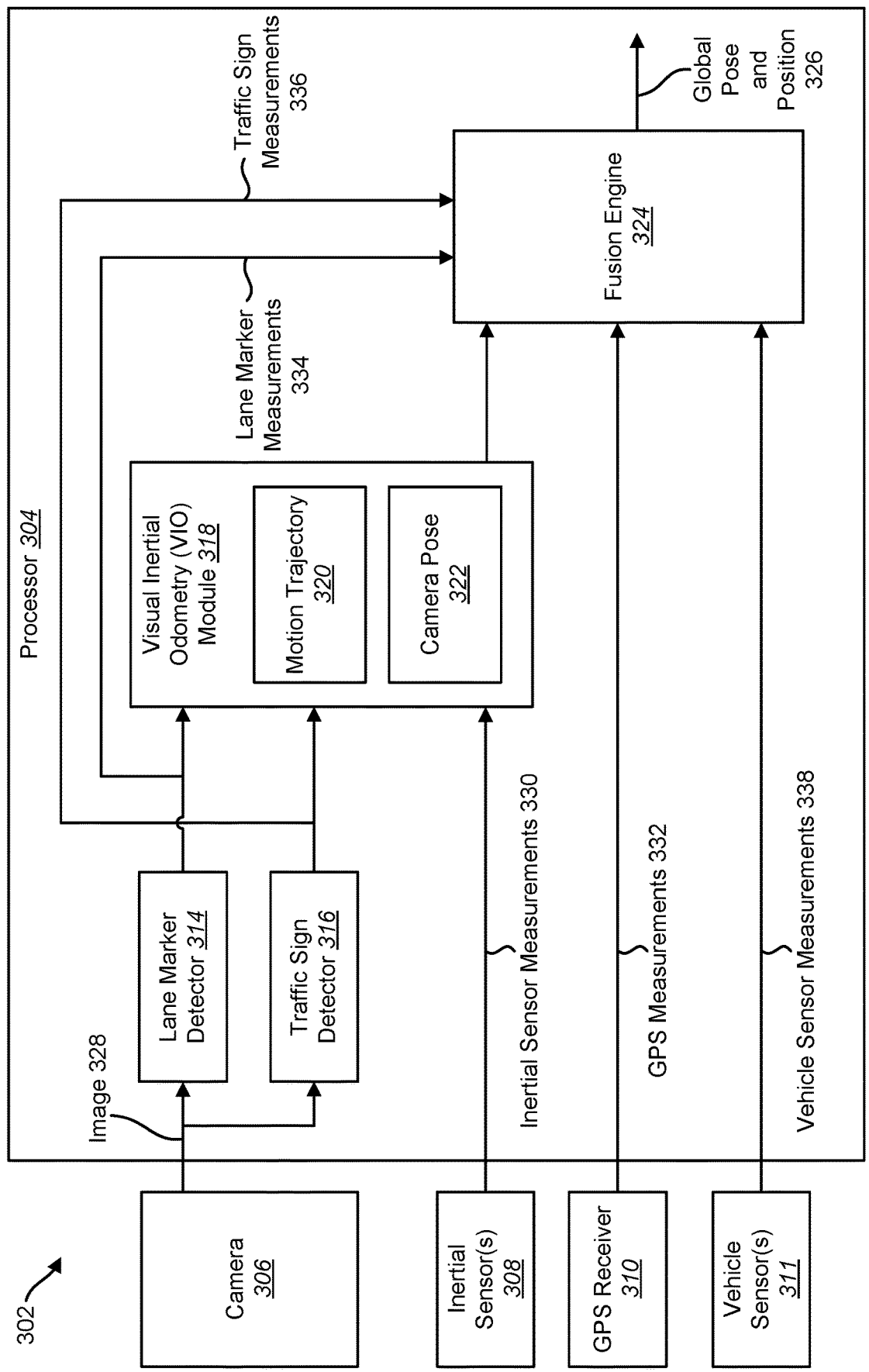
FIG. 3 is a block diagram illustrating another example of an electronic device in which systems and methods for determining a vehicle position may be implemented.

FIG. 3 is a block diagram illustrating another example of an electronic device 302 in which systems and methods for determining a vehicle position may be implemented. The electronic device 302 described in connection with FIG. 3 may be implemented in accordance with the electronic device 102 described in connection with FIG. 1.

The electronic device 302 may be configured with a camera 306, one or more inertial sensors 308, a GPS receiver 310, one or more vehicle sensors 311 and a processor 304. The camera 306 may provide images 328 to the processor 304. The inertial sensor 308 may provide inertial sensor measurements 330 to the processor 304. For example, the inertial sensor measurements 330 may include measurements from one or more accelerometers or one or more gyroscopes.

The GPS receiver 310 may provide GPS measurements 332 to the processor 304. The GPS measurements 332 may include GPS coordinates. It should be noted that while a GPS receiver 310 is described, other satellite navigation measurements may be used. For example, the GPS receiver 310 may be implemented as a GNSS receiver.

The one or more vehicle sensors 311 may provide vehicle sensor measurements 338 to the processor 304. Examples of the vehicle sensors 311 include a wheel-speed encoder, a driving axle angle sensor and/or a speedometer. Examples of the vehicle sensor measurements 338 include vehicle speed, wheel speed or driving axle angle.

The processor 304 may include or may implement a lane marker detector 314. The lane marker detector 314 may receive the images 328 from the camera 306. The lane marker detector 314 may determine lane marker measurements 334. For example, the lane marker detector 314 may detect one or more lane markers in an image 328. The lane marker detector 314 may also determine three or more feature points on a detected lane marker.

The processor 304 may also include or may implement a traffic sign detector 316. The traffic sign detector 316 may receive the images 328 from the camera 306. The traffic sign detector 316 may determine traffic sign measurements 336. For example, the traffic sign detector 316 may detect one or more traffic signs in an image 328. The traffic sign detector 316 may also determine three or more feature points on a detected traffic sign.

The processor 304 may also include or may implement a visual inertial odometry (VIO) module 318. The VIO module 318 may be configured to receive inertial sensor measurements 330, the lane marker measurements 334 and the traffic sign measurements 336. The VIO module 318 may determine the motion trajectory 320 of the electronic device 302 and the camera pose 322 based on the inertial sensor measurements 330, the lane marker measurements 334, the traffic sign measurements 336 or a combination thereof.

In an implementation, the VIO module 318 may combine the lane marker measurements 334 or the traffic sign measurements 336 with inertial sensor measurements 330. For example, the VIO module 318 may couple the measurements 334, 336 of the lane marker features and traffic signs with inertial sensor measurements 330 to jointly determine the motion trajectory 320 and camera pose 322. In this case, the VIO module 318 may use the inertial sensor measurements 330 when vehicle acceleration is observable. The VIO module 318 may use the lane marker measurements 334 and the traffic sign measurements 336 when the inertial sensor measurements 330 are negligible (e.g., when acceleration is not observable).

In another configuration, the VIO module 318 may use the lane marker measurements 334 or the traffic sign measurements 336 to supplement the inertial sensor measurements 330. For example, the VIO module 318 may use the lane marker measurements 334 or the traffic sign measurements 336 to perform a redundancy check on the motion trajectory 320 and the camera pose 322 determined from the inertial sensor measurements 330.

In another implementation, the processor 304 may also include or may implement a fusion engine 324. The fusion engine 324 may combine GPS measurements 332 with the motion trajectory 320 and the camera pose 322 determined by the VIO module 318. The fusion engine 324 may determine a global pose and position 326 based on the combined measurements. The global pose and position 326 may include the motion trajectory 320 and camera pose 322 in a global frame.

GPS pseudorange information is known to suffer from multi-path when a vehicle is being driven in urban canyons. The information that the GPS receiver 310 receives may be scattered all around. For example, GPS information may jump around while a vehicle is driving in the city because of tall buildings. Another advantage of using the information from the lane marker detector 314 and traffic sign detector 316 is outlier detection and rejection of GPS and VIO fusion outputs.

The fusion engine 324 may be configured to receive lane marker measurements 334 and traffic sign measurements 336. The fusion engine 324 may use the lane marker measurements 334 and traffic sign measurements 336 to verify the global pose and position 326. For example, if the GPS/VIO fusion estimates that the position of the vehicle is outside a lane, knowing the history of lateral offset from the lane-markers (as determined by the lane marker detector 314, for instance) may correct for this.

The fusion engine 324 may reject the GPS outliers and keep updating vehicle position on the basis of a vehicle model. For example, by using the lane marker measurements 334 and traffic sign measurements 336 to determine the motion trajectory 320 and camera pose 322, the electronic device 302 may know that the vehicle has been traveling in a particular lane for some duration of time. If the GPS/VIO fusion estimates that the position of the vehicle is outside the lane, whereas the lane marker detector 314 indicates that the vehicle never crossed the lane, then the electronic device 302 can rely more on the lane marker detector 314, and may reject the results from the GPS/VIO fusion. In this manner, the systems and method described herein may provide a redundancy check on the results of the GPS algorithm.

In yet another implementation, the fusion engine 324 may receive vehicle sensor measurements 338. In one approach, the fusion engine 324 may combine the vehicle sensor measurements 338 (e.g., speedometer measurements) with the measurements 334, 336 of the detected object (e.g., lane marker or traffic sign). The fusion engine 324 may determine the global pose and position 326 based on the combined measurements. In another approach, the fusion engine 324 may combine the vehicle sensor measurements 338 from the one or more vehicle sensors 311 with the GPS measurements 332 and the measurements 334, 336 of the detected object (e.g., lane marker or traffic sign). The fusion engine 324 may determine the global pose and position 326 based on the combined measurements.

In one implementation, the processor 304 may be included in a vehicle (e.g., a car, truck, bus, boat, robot, etc.). Therefore, the vehicle may be configured to determine its own global pose and position 326.

In another implementation, the processor 304 may be included in a server that is separate from the vehicle. For example, the server may receive the images 328, inertial sensor measurements 330, GPS measurements 332 and/or vehicle sensor measurements 338 from a remote source (e.g., a vehicle). The server may determine the motion trajectory 320, the camera pose 322 and/or the global pose and position 326 of the vehicle using this information.

In yet another implementation, the vehicle or server may be configured to transmit the motion trajectory 320, the camera pose 322 and/or the global pose and position 326 to a mapping service. For example, the mapping service may be a cloud-based service. The mapping service may detect and localize key landmarks to generate precise localization maps. The mapping service may generate a location estimate of the vehicle in the global frame. For example, the vehicle may transmit the motion trajectory 320, the camera pose 322, inertial sensor measurements 330, GPS measurements 332 and/or vehicle sensor measurements 338 to the mapping service. The mapping service may then determine the global pose and position 326 of the vehicle in a localization map.

Figure 4:
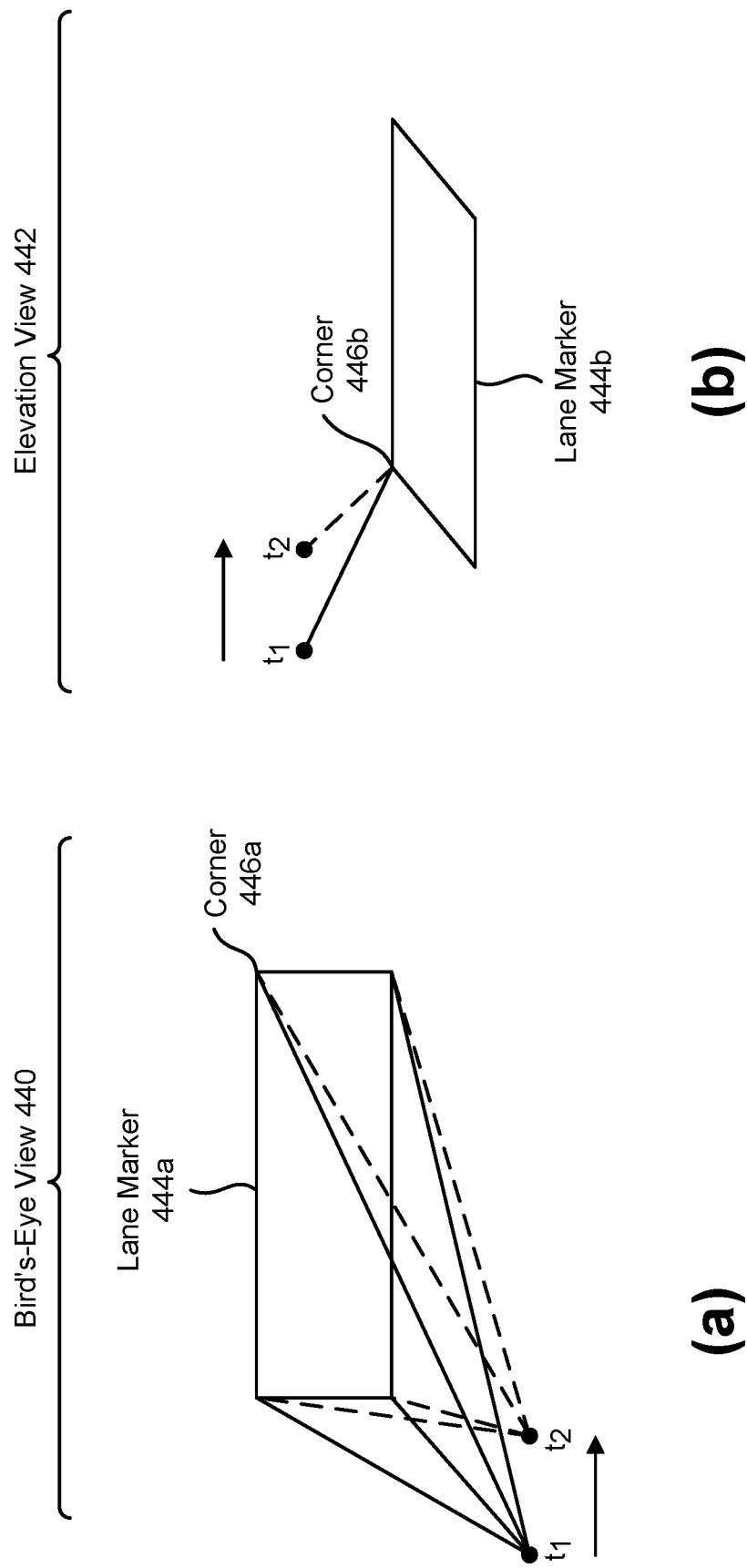
FIG. 4 illustrates examples of vehicle positioning using lane marker detection.

FIG. 4 illustrates examples of vehicle positioning using lane marker detection. A first example (a) shows a bird's-eye view 440 of vehicle motion with respect to a lane marker 444a. In this example, a vehicle moves from a first position at a first time ($t_1$) to a second position at a second time ($t_2$). The lane marker 444a includes four corners 446a. This example depicts the changes in geometry from the four corners 446a as the vehicle moves from the first position at time $t_1$ to the second position at time $t_2$.

A corresponding elevation view 442 of the lane marker 444b is shown in the second example (b). This example depicts the change in geometry from a corner 446b as the vehicle moves from the first position at time $t_1$ to the second position at time $t_2$.

As observed in these examples, the electronic device 102 may detect a lane marker 444 in an image 328 using a lane marker detector 114. The lane marker detector 114 may detect three or more corners 446 on the lane marker 444. By tracking the corners 446 and comparing the changes in the vehicle orientation with respect to the corners 446 from time $t_1$ to time $t_2$, the electronic device 102 may determine the motion trajectory 120 and camera pose 122 of the vehicle.

Figure 5:
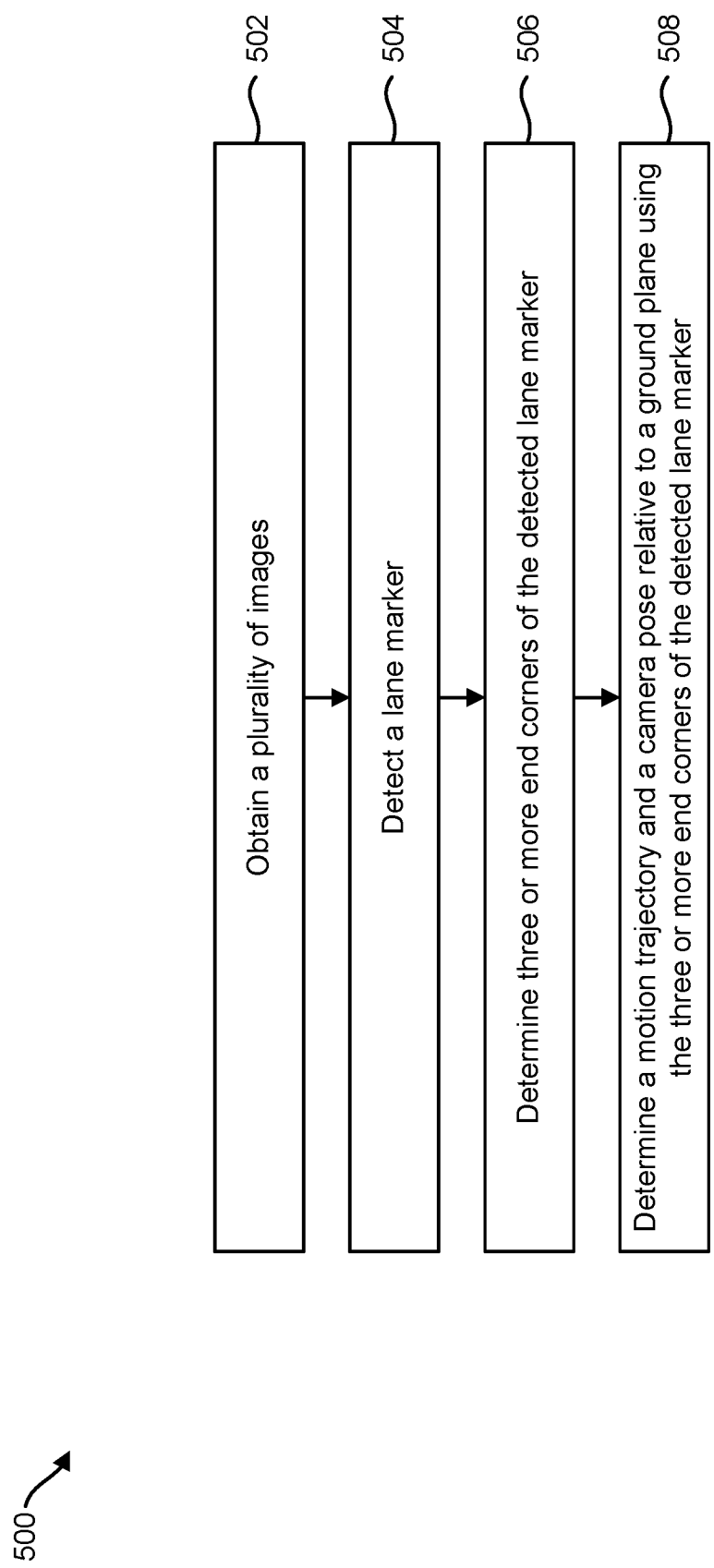
FIG. 5 is a flow diagram illustrating one configuration of a method for determining a vehicle position based on lane marker detection.

FIG. 5 is a flow diagram illustrating one configuration of a method 500 for determining a vehicle position based on lane marker detection. The method 500 may be performed by an electronic device 102 as described herein.

The electronic device 102 may obtain 502 a plurality of images 328. For example, the electronic device 102 may be configured with a camera 106. The camera 106 may capture one or more images 328 (e.g., digital images, image frames, video, etc.).

The electronic device 102 may detect 504 a lane marker 444. For example, the electronic device 102 may be configured with a lane marker detector 114. The lane marker detector 114 may use computer vision (CV)-based or deep neural network algorithms to detect a lane marker 444 or a lane marker segment in an image 328.

The electronic device 102 may determine 506 three or more end corners 446 of the detected lane marker 444. For example, the lane marker detector 114 may be configured to identify the corners 446 of the lane marker 444. The lane marker detector 114 may provide pixel coordinates for the lane marker corners 446. It should be noted that at least three separate corners 446 from the same lane marker 444 may be identified to enable the electronic device 102 to determine the pose of the camera 106.

The electronic device 102 may determine 508 a motion trajectory 120 and a camera pose 122 relative to a ground plane using the three or more end corners 446 of the detected lane marker 444. For example, the electronic device 102 may determine scale information using the three or more end corners 446. In an implementation, the electronic device 102 may determine 508 the motion trajectory 120 and the camera pose 122 by comparing the three or more end corners 446 determined from a first image 328 to a corresponding three or more end corners 446 determined from a second image 328.

Figure 6:
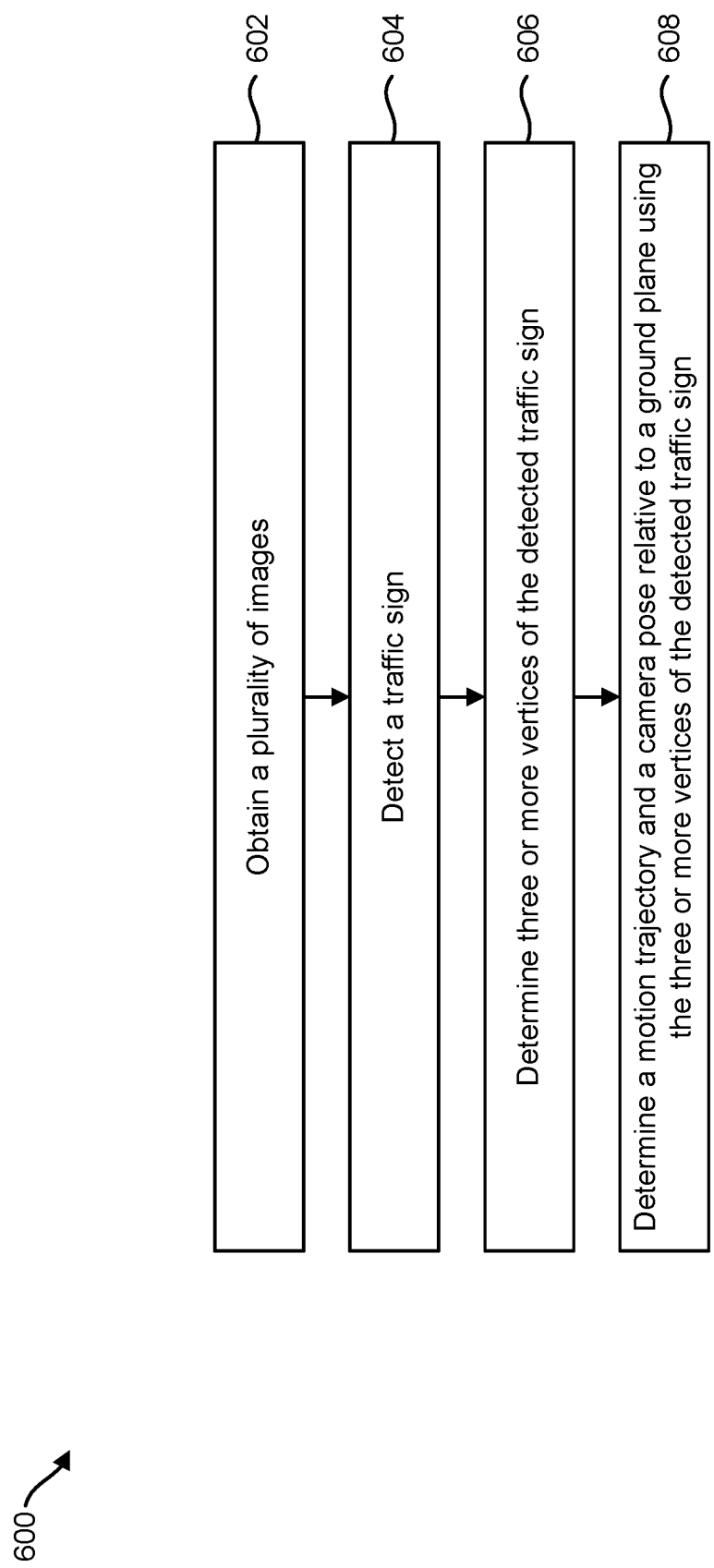
FIG. 6 is a flow diagram illustrating a configuration of a method for determining a vehicle position based on traffic sign detection.

FIG. 6 is a flow diagram illustrating a configuration of a method 600 for determining a vehicle position based on traffic sign detection. The method 600 may be performed by an electronic device 102 as described herein.

The electronic device 102 may obtain 602 a plurality of images 328. For example, the electronic device 102 may be configured with a camera 106. The camera 106 may capture one or more images 328 (e.g., digital images, image frames, video, etc.).

The electronic device 102 may detect 604 a traffic sign. For example, the electronic device 102 may be configured with a traffic sign detector 116. The traffic sign detector 116 may use computer vision (CV)-based or deep neural network algorithms to detect a traffic sign in an image 328.

The electronic device 102 may determine 606 three or more vertices of the detected traffic sign. For example, the traffic sign detector 116 may be configured to identify vertices of a traffic sign. The traffic sign detector 116 may provide pixel coordinates for the traffic sign vertices. It should be noted that at least three separate vertices from the same traffic sign may be identified to enable the electronic device 102 to determine the pose of the camera 106.

The electronic device 102 may determine 608 a motion trajectory 120 and a camera pose 122 relative to a ground plane using the three or more vertices of the detected traffic sign. For example, the electronic device 102 may determine scale information using the three or more traffic sign vertices. In an implementation, the electronic device 102 may determine 608 the motion trajectory 120 and the camera pose 122 by comparing the three or more traffic sign vertices determined from a first image 328 to a corresponding traffic sign vertices determined from a second image 328.

Figure 7:
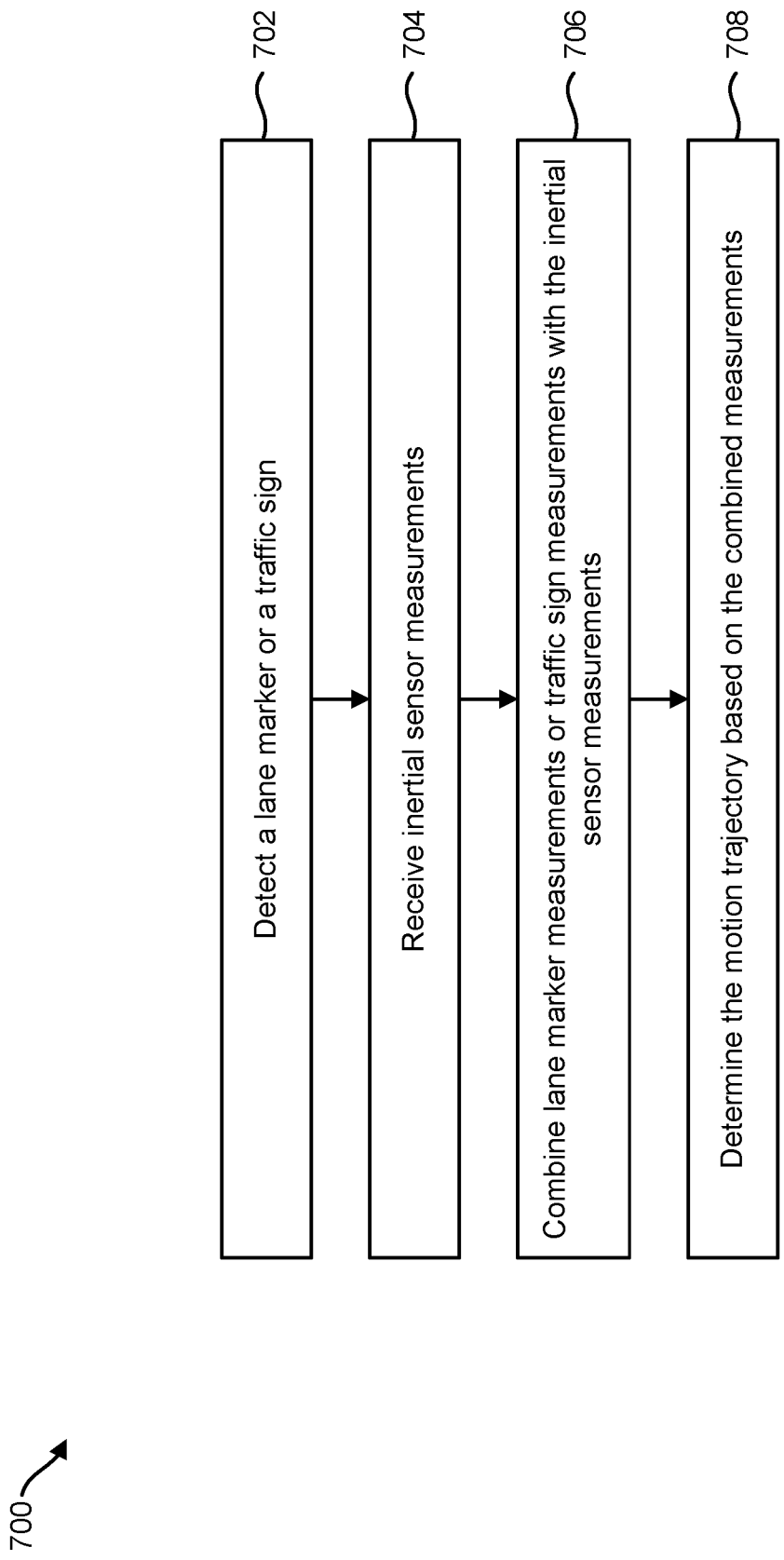
FIG. 7 is a flow diagram illustrating another configuration of a method for determining a vehicle position.

FIG. 7 is a flow diagram illustrating another configuration of a method 700 for determining a vehicle position. The method 700 may be performed by an electronic device 302 as described herein.

The electronic device 302 may detect 702 a lane marker 444 or a traffic sign. For example, the electronic device 302 may be configured with a lane marker detector 314, a traffic sign detector 316 or both. The lane marker detector 314 may use computer vision (CV)-based or deep neural network algorithms to detect a lane marker 444 or a lane marker segment in an image 328. The lane marker detector 314 may generate lane marker measurements 334.

The traffic sign detector 316 may also use CV-based or deep neural network algorithms to detect one or more traffic signs in an image 328. The traffic sign detector 316 may generate traffic sign measurements 336.

The electronic device 302 may receive 704 inertial sensor measurements 330. For example, the electronic device 302 may be configured with one or more inertial sensors 308. An inertial sensor 308 may include one or more accelerometers and/or one or more gyroscopes with which the inertial sensor 308 generates the inertial sensor measurements 330.

The electronic device 302 may combine 706 the lane marker measurements 334 or the traffic sign measurements 336 with the inertial sensor measurements 330. For example, the electronic device 302 may provide the lane marker measurements 334, the traffic sign measurements 336 and the inertial sensor measurements 330 to a VIO module 318.

The electronic device 302 may determine 708 a motion trajectory 320 based on the combined measurements. For example, the VIO module 318 may use the inertial sensor measurements 330 to determine scale information for an image 328 when vehicle acceleration is observable. The VIO module 318 may use the lane marker measurements 334 and the traffic sign measurements 336 to determine scale information for an image 328 when the inertial sensor measurements 330 are negligible (e.g., when acceleration is not observable).

Figure 8:
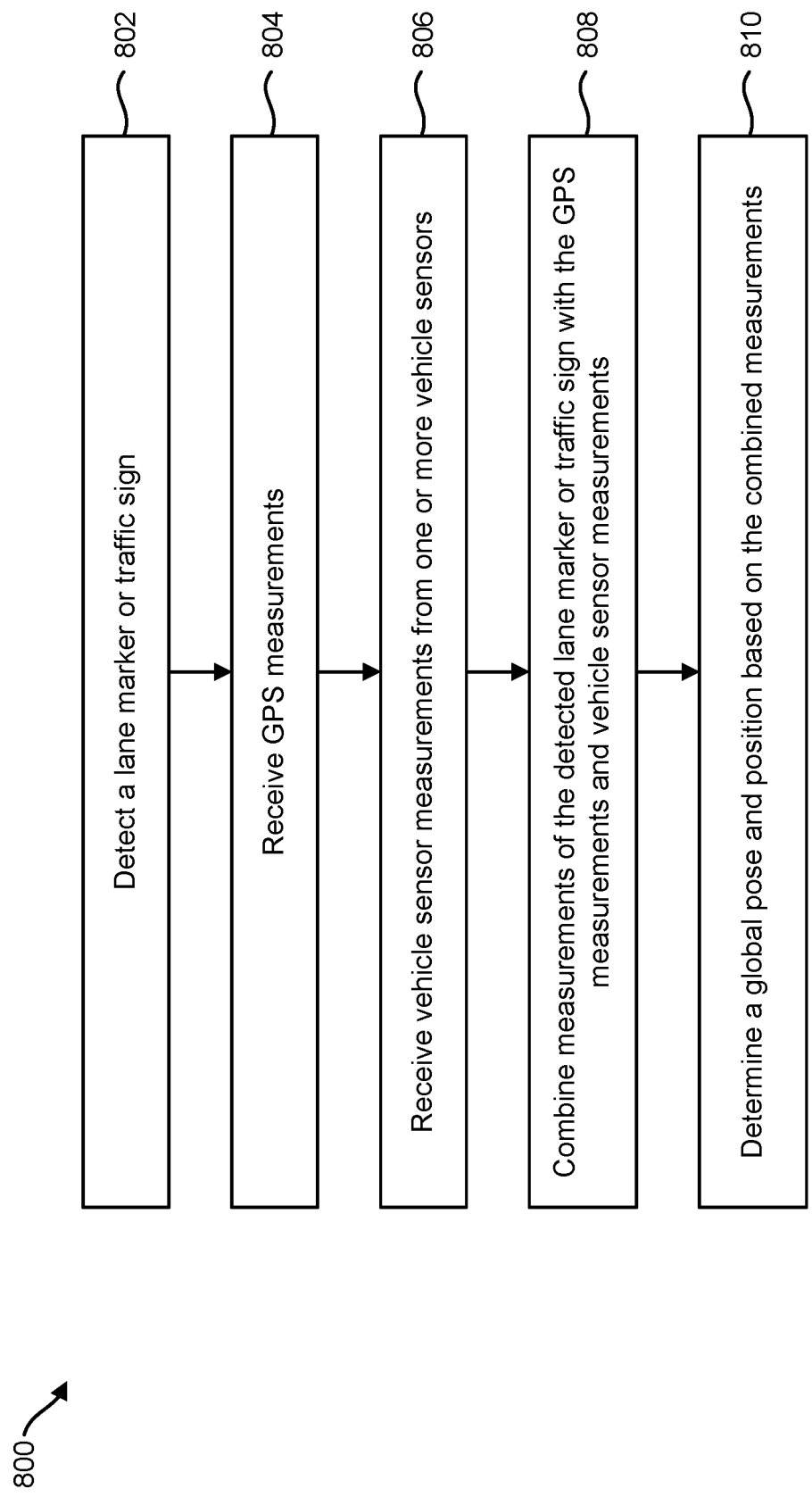
FIG. 8 is a flow diagram illustrating yet another configuration of a method for determining a vehicle position.

FIG. 8 is a flow diagram illustrating yet another configuration of a method 800 for determining a vehicle position. The method 800 may be performed by an electronic device 302 as described herein.

The electronic device 302 may detect 802 a lane marker 444 or a traffic sign. For example, the electronic device 302 may be configured with a lane marker detector 314, a traffic sign detector 316 or both. The lane marker detector 314 may generate lane marker measurements 334. The traffic sign detector 316 may generate traffic sign measurements 336.

The electronic device 302 may receive 804 GPS measurements 332. For example, a GPS receiver 310 may receive GPS signals. The GPS receiver 310 may determine the latitude and longitude of the electronic device 302 based on the GPS signals.

The electronic device 302 may receive 806 vehicle sensor measurements 338 from one or more vehicle sensors 311. The vehicle sensor measurements 338 include wheel speed or driving axle angle.

The electronic device 302 may combine 808 the lane marker measurements 334, traffic sign measurements 336, GPS measurements 332 and vehicle sensor measurements 338. For example, a fusion engine 324 may receive the lane marker measurements 334, traffic sign measurements 336, GPS measurements 332 and vehicle sensor measurements 338.

The electronic device 302 may determine 810 a global pose and position 326 based on the combined measurements. For example, the electronic device 302 may determine the localized motion trajectory 320 and camera pose 322 based on the lane marker measurements 334 and traffic sign measurements 336. The fusion engine 324 may locate the motion trajectory 320 and camera pose 322 in a global frame using the GPS measurements 332 and vehicle sensor measurements 338.

Figure 9:
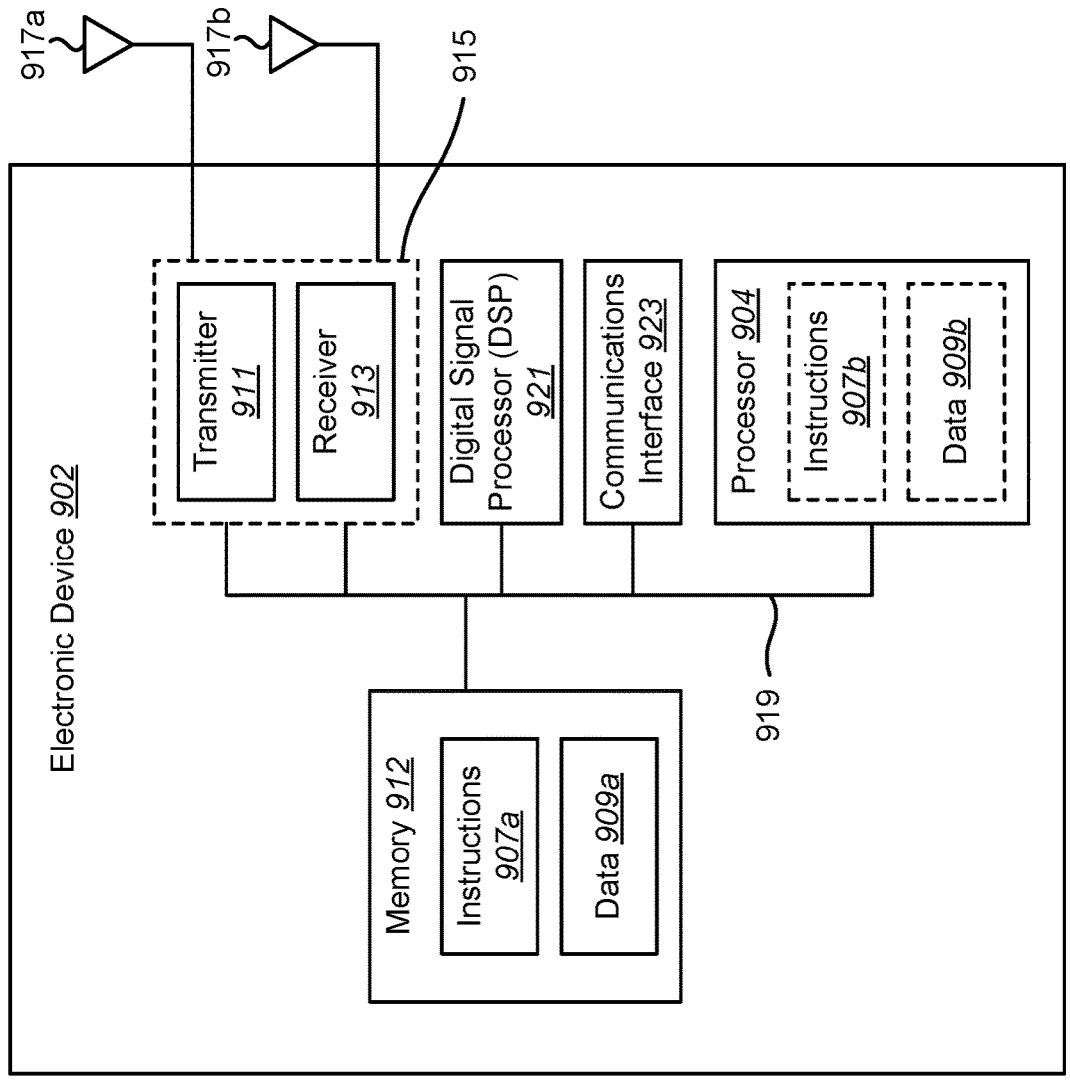
FIG. 9 illustrates certain components that may be included within an electronic device configured to implement various configurations of the systems and methods disclosed herein.

FIG. 9 illustrates certain components that may be included within an electronic device 902 configured to implement various configurations of the systems and methods disclosed herein. Examples of the electronic device 902 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The electronic device 902 may be implemented in accordance with one or more of the electronic devices 102 described herein.

The electronic device 902 includes a processor 904. The processor 904 may be a general-purpose single- or multi-chip microprocessor (e.g., an ARM), a special-purpose microprocessor (e.g., a digital signal processor (DSP)), a microcontroller, a programmable gate array, etc. The processor 904 may be referred to as a central processing unit (CPU). Although just a single processor 904 is shown in the electronic device 902, in an alternative configuration, a combination of processors (e.g., an ARM and DSP) could be implemented.

The electronic device 902 also includes memory 912. The memory 912 may be any electronic component capable of storing electronic information. The memory 912 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 909a and instructions 907a may be stored in the memory 912. The instructions 907a may be executable by the processor 904 to implement one or more of the methods, procedures, steps, and/or functions described herein. Executing the instructions 907a may involve the use of the data 909a that is stored in the memory 912. When the processor 904 executes the instructions 907, various portions of the instructions 907b may be loaded onto the processor 904 and/or various pieces of data 909b may be loaded onto the processor 904.

The electronic device 902 may also include a transmitter 911 and/or a receiver 913 to allow transmission and reception of signals to and from the electronic device 902. The transmitter 911 and receiver 913 may be collectively referred to as a transceiver 915. One or more antennas 917a-b may be electrically coupled to the transceiver 915. The electronic device 902 may also include (not shown) multiple transmitters, multiple receivers, multiple transceivers and/or additional antennas.

The electronic device 902 may include a digital signal processor (DSP) 921. The electronic device 902 may also include a communications interface 923. The communications interface 923 may allow and/or enable one or more kinds of input and/or output. For example, the communications interface 923 may include one or more ports and/or communication devices for linking other devices to the electronic device 902. In some configurations, the communications interface 923 may include the transmitter 911, the receiver 913, or both (e.g., the transceiver 915). Additionally or alternatively, the communications interface 923 may include one or more other interfaces (e.g., touchscreen, keypad, keyboard, microphone, camera, etc.). For example, the communication interface 923 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method, comprising:
   obtaining a plurality of images;
   detecting an object in the plurality of images, wherein the object comprises a traffic guidance object;
   determining a plurality of feature points on the object, wherein the feature points have an established relationship to each other based on an object type;
   determining an acceleration measurement; and
   determining a motion trajectory and a camera pose relative to a ground plane using the plurality of feature points based on the acceleration measurement, wherein the motion trajectory and the camera pose determined using the plurality of feature points supplement a motion trajectory and a camera pose determined from inertial sensor measurements.

2. The method of claim 1, wherein the object includes a lane marker or a traffic sign.

3. The method of claim 1, wherein determining the plurality of feature points comprises determining three or more end corners of a detected lane marker.

4. The method of claim 1, wherein determining the plurality of feature points comprises determining three or more vertices of a detected traffic sign.

5. The method of claim 1, wherein determining the motion trajectory comprises determining scale information using the plurality of feature points.

6. The method of claim 1, wherein determining the motion trajectory and the camera pose comprises comparing a plurality of feature points determined from a first image to corresponding feature points determined from a second image.

7. The method of claim 1, further comprising:
   combining measurements of the detected object with inertial sensor measurements; and
   determining the motion trajectory based on the combined measurements.

8. The method of claim 1, further comprising:
   combining satellite navigation receiver measurements with measurements of the detected object; and
   determining a pose and position in a global frame based on the combined measurements.

9. The method of claim 8, further comprising:
   combining vehicle sensor measurements from one or more vehicle sensors with the satellite navigation receiver measurements and measurements of the detected object; and
   determining the pose and position in the global frame based on the combined measurements.

10. The method of claim 1, further comprising:
    combining measurements of the detected object with speedometer measurements; and
    determining the motion trajectory based on the combined measurements.

11. The method of claim 1, wherein the method is performed in a vehicle.

12. The method of claim 11, further comprising transmitting the camera pose to a mapping service.

13. The method of claim 1, wherein the method is performed by a server.

14. An electronic device, comprising:
    a memory; and
    a processor in communication with the memory, the processor configured to:
      obtain a plurality of images;
      detect an object in the plurality of images, wherein the object comprises a traffic guidance object;
      determine a plurality of feature points on the object, wherein the feature points have an established relationship to each other based on an object type;
      determine an acceleration measurement; and
      determine a motion trajectory and a camera pose relative to a ground plane using the plurality of feature points based on the acceleration measurement, wherein the motion trajectory and the camera pose determined using the plurality of feature points supplement a motion trajectory and a camera pose determined from inertial sensor measurements.

15. The electronic device of claim 14, wherein the object includes a lane marker or a traffic sign.

16. The electronic device of claim 14, wherein the processor configured to determine the plurality of feature points comprises the processor configured to determine three or more end corners of a detected lane marker.

17. The electronic device of claim 14, wherein the processor configured to determine the plurality of feature points comprises the processor configured to determine three or more vertices of a detected traffic sign.

18. The electronic device of claim 14, wherein the processor configured to determine the plurality of feature points comprises the processor configured to determine scale information using the plurality of feature points.

19. The electronic device of claim 14, wherein the processor configured to determine the motion trajectory and the camera pose comprises the processor configured to compare a plurality of feature points determined from a first image to corresponding feature points determined from a second image.

20. A non-transitory computer readable medium storing computer executable code, comprising:
   code for causing an electronic device to obtain a plurality of images;
   code for causing the electronic device to detect an object in the plurality of images, wherein the object comprises a traffic guidance object;
   code for causing the electronic device to determine a plurality of feature points on the object, wherein the feature points have an established relationship to each other based on an object type;
   code for causing the electronic device to determine an acceleration measurement; and
   code for causing the electronic device to determine a motion trajectory and a camera pose relative to a ground plane using the plurality of feature points based on the acceleration measurement, wherein the motion trajectory and the camera pose determined using the plurality of feature points supplement a motion trajectory and a camera pose determined from inertial sensor measurements.

21. The computer readable medium of claim 20, wherein the object includes a lane marker or a traffic sign.

22. The computer readable medium of claim 20, wherein the code for causing the electronic device to determine the plurality of feature points comprises code for causing the electronic device to determine three or more end corners of a detected lane marker.

23. The computer readable medium of claim 20, wherein the code for causing the electronic device to determine the plurality of feature points comprises code for causing the electronic device to determine three or more vertices of a detected traffic sign.

24. The computer readable medium of claim 20, wherein the code for causing the electronic device to determine the motion trajectory comprises code for causing the electronic device to determine scale information using the plurality of feature points.

25. The computer readable medium of claim 20, wherein code for causing the electronic device to determine the motion trajectory and the camera pose comprises code for causing the electronic device to compare a plurality of feature points determined from a first image to corresponding feature points determined from a second image.

26. An apparatus, comprising:
   means for obtaining a plurality of images;
   means for detecting an object in the plurality of images, wherein the object comprises a traffic guidance object;
   means for determining a plurality of feature points on the object, wherein the feature points have an established relationship to each other based on an object type;
   means for determining an acceleration measurement; and
   means for determining a motion trajectory and a camera pose relative to a ground plane using the plurality of feature points based on the acceleration measurement, wherein the motion trajectory and the camera pose determined using the plurality of feature points supplement a motion trajectory and a camera pose determined from inertial sensor measurements.

27. The apparatus of claim 26, wherein the object includes a lane marker or a traffic sign.

28. The apparatus of claim 26, wherein the means for determining the plurality of feature points comprise means for determining three or more end corners of a detected lane marker.

29. The apparatus of claim 26, wherein the means for determining the plurality of feature points comprise means for determining three or more vertices of a detected traffic sign.

30. The apparatus of claim 26, wherein the means for determining the plurality of feature points comprise means for determining scale information using the plurality of feature points.

31. The method of claim 1, wherein measurements of the plurality of feature points on the object are used to compensate for scale drift of an inertial sensor in response to determining the acceleration measurement.

* * * * *